Aug. 14, 1962  L. KIRCHLER  3,049,365
TANDEM WHEEL STRUCTURE FOR CONNECTING EARTH MOVERS
Filed Dec. 30, 1960  3 Sheets-Sheet 3
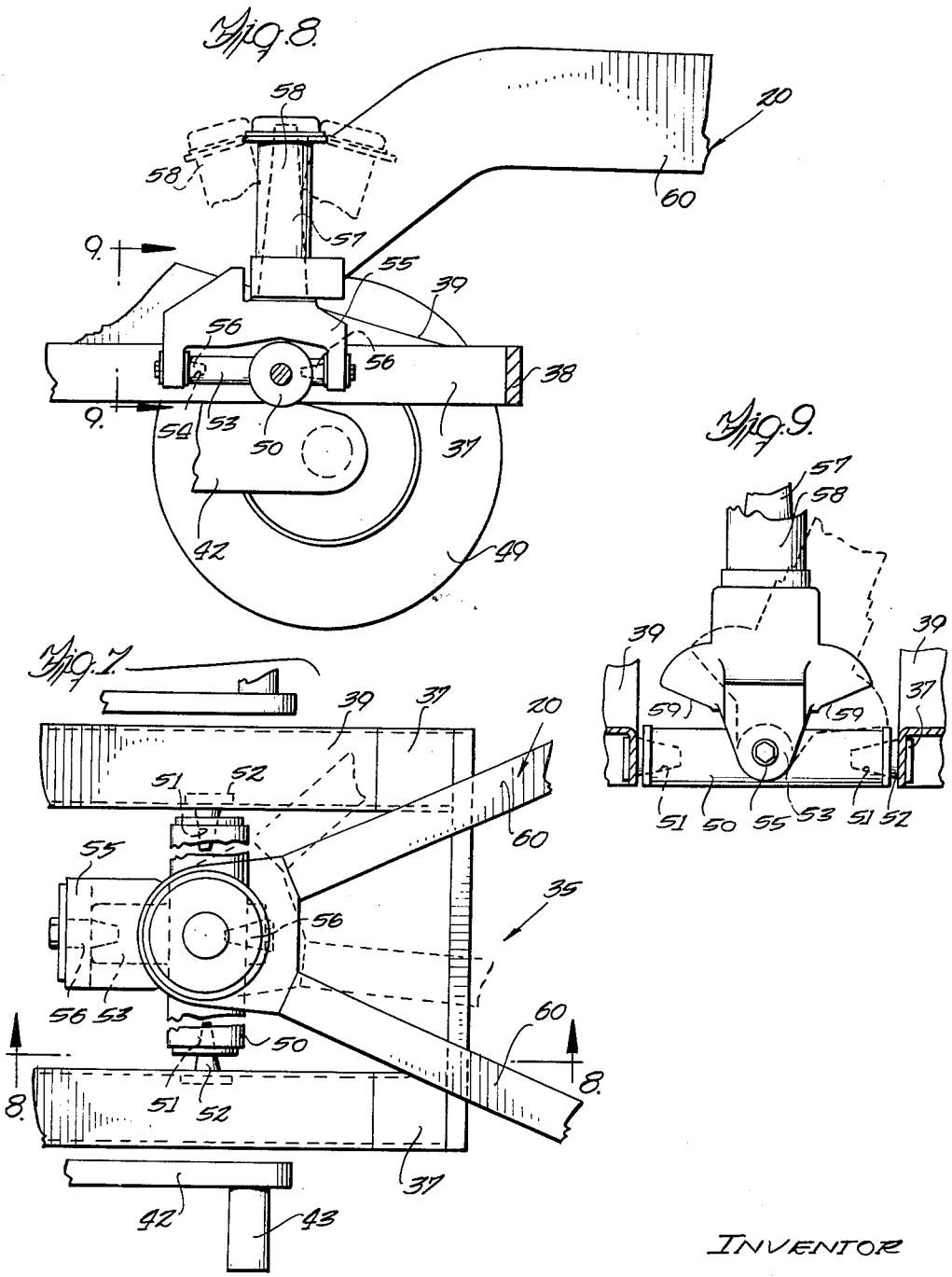
INVENTOR
LEWIS KIRCHLER
Paul O. Pippel
ATTORNEY Patented Aug. 14, 1962

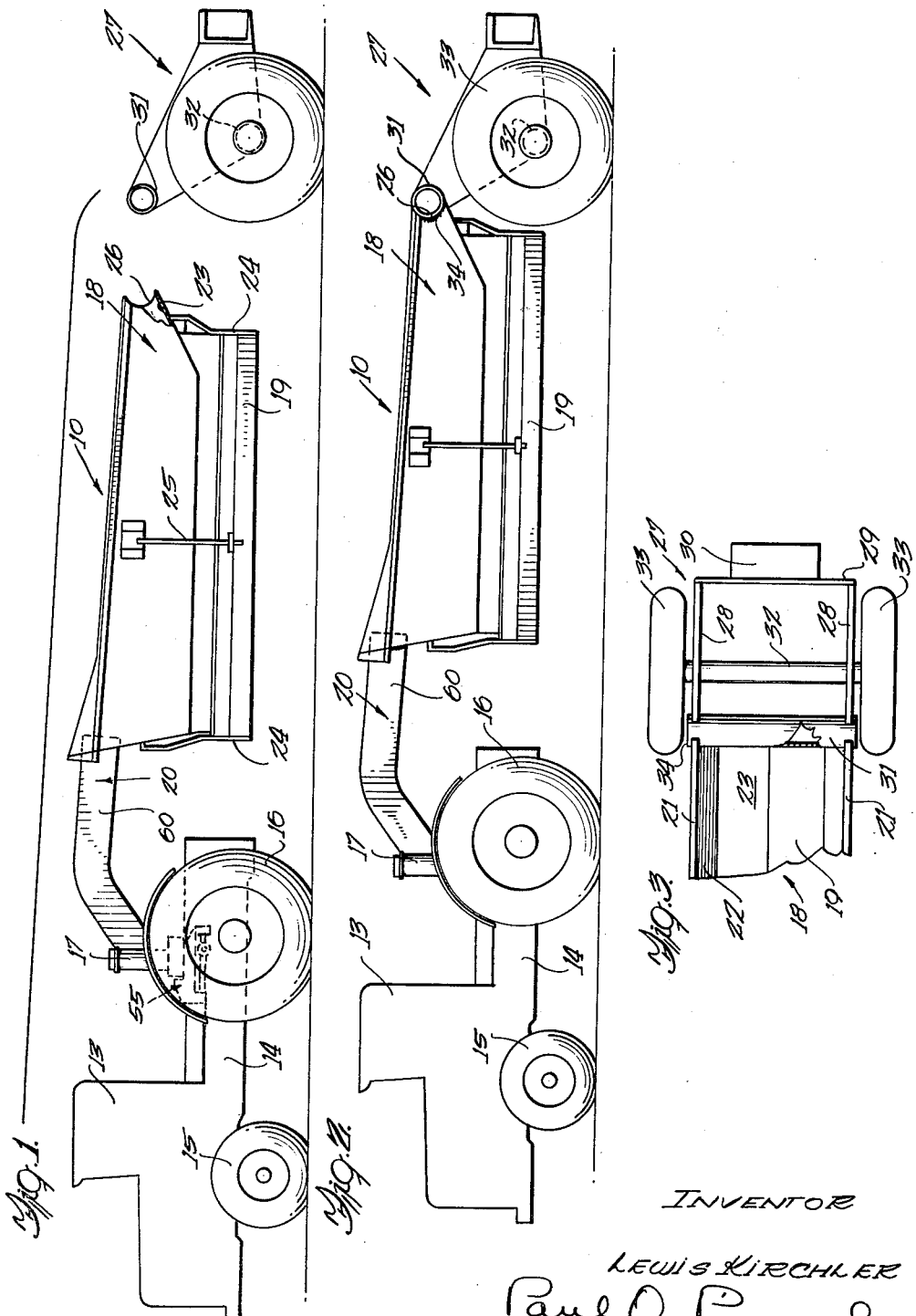

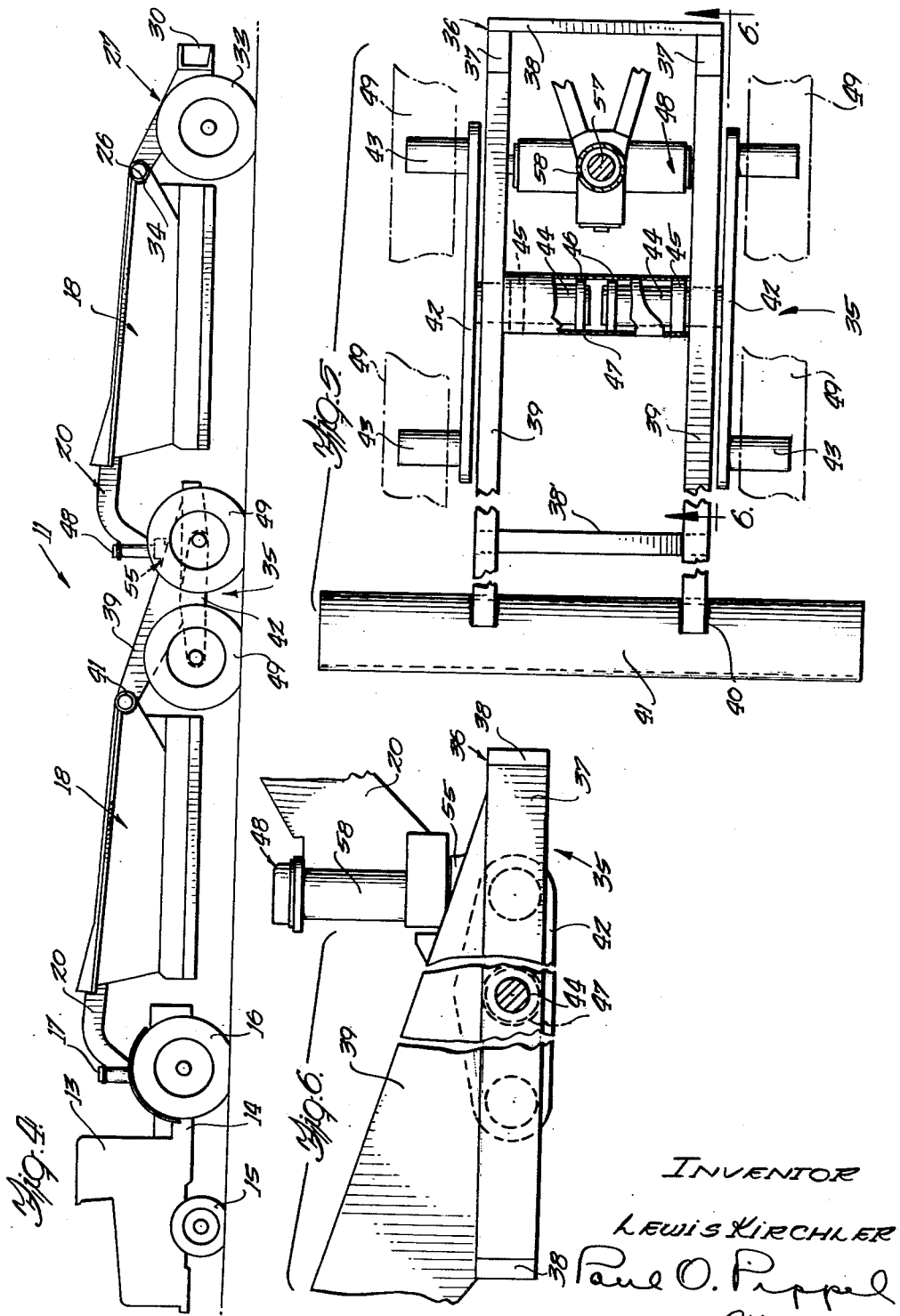

3,049,365
TANDEM WHEEL STRUCTURE FOR CONNECTING EARTH MOVERS
Lewis Kirchler, Skokie, Ill., assignor to International Harvester Company, Chicago, Ill., a corporation of New Jersey
Filed Dec. 30, 1960, Ser. No. 79,590
8 Claims. (Cl. 280—408)

This invention relates to earthmovers and more particularly to a wheel supported structure for connecting off-the-highway earthmovers in tandem relation.

It is a prime object of this invention to provide a wheel supported structure for quickly connecting off-the-highway earth haulers in tandem relation.

Still another object is to provide an improved earth hauler having a rear wheel supported structure which is quickly disconnectible from the body of the hauler so that it may be connected to a tandem structure for connecting several of the haulers in tandem relation.

A still more specific object of the invention is to provide a wheel supported structure for off-the-highway earth haulers, the said structure including a transversely extending structural tube member adapted to be secured in a cradle-type arrangement provided at the rear end of the earth hauler, the said cradle arrangement permitting fast assembly and disassembly so that two or more earth hauler bodies or earthmover bodies may be connected in tandem relation.

Another more specific object is to provide an improved tandem wheel support for connecting two or more earth hauler bodies in tandem, the said support including rockable wheel supports on opposite sides whereby wheels supported on opposite sides of said tandem wheel support may follow the contour of the ground and move independently with respect to the other.

These and other objects will become more readily apparent from a reading of the description when examined in connection with the accompanying sheets of drawings.

In the drawings:

FIGURE 1 is a side-elevational view of an earth hauler connected to a tractor and showing the rear wheel support removed prior to reassembly of the same with the earth hauler body;

FIGURE 2 is a side-elevational view of the earth hauler and tractor shown in FIGURE 1 with the rear wheel support in assembled position with the earth hauler body;

FIGURE 3 is a plan view of the rear portion of an earth hauler body showing a wheel support connected thereto;

FIGURE 4 is a side-elevational view showing a tractor and two earth hauler bodies connected together in tandem relation by means of a tandem wheel structure;

FIGURE 5 is an enlarged plan view, partially in section, showing the tandem wheel structure disclosed in FIGURE 4;

FIGURE 6 is a cross-sectional view taken substantially along the line 6—6 of FIGURE 5;

FIGURE 7 is an enlarged plan view of the rear portion of a tandem wheel structure showing a fifth wheel connection;

FIGURE 8 is a cross-sectional view of a portion of a tandem wheel structure taken substantially along the line 8—8 of FIGURE 7; and FIGURE 9 is a detail cross-sectional view of a portion of a fifth wheel taken particularly along the line 9—9 of FIGURE 8.

Referring to FIGURES 1 and 2, an earthmoving vehicle is generally designated by the reference character 10. In FIGURE 4, the earthmoving vehicle is designated at 11 and consists of a pair of earth hauling units positioned in tandem as will be presently described. For both the vehicles 10 and 11 a tractor designated at 13 is provided. The tractor 13 includes a tractor frame 14 suitably supported on steerable wheels 15 and on traction wheels 16. The tractor frame 14 also supports a fifth wheel structure generally designated at 17.

A dump body, as shown in FIGURE 4, is designated at 18, the said body including dump doors 19 and having connected thereto a gooseneck structure 20. The body 18 and the operating mechanism for opening and closing the doors is the same as shown in the J. R. Wilkinson Patent 2,943,886 patented on July 5, 1960. The body 18 is also provided with vertical side members 21 of relatively heavy metal sheet construction, particularly at their rearmost ends. Bottom side members 22 also are connected between the sides 21 and terminate in an upwardly sloping portion 23 best shown in FIGURES 1 and 3. The opposite ends of the body are provided with hinge members 24 which hingedly connect the doors 19 to the body 18. A door opening mechanism is generally designated by 25 and this mechanism including the hinge members 24 and doors 19, and the operation thereof are completely described in the Wilkinson patent beforementioned.

The ends of the sides 21 are provided with arcuate cutouts or recesses, which in effect provide cradles designated by the reference character 26. The sides are formed of sufficiently strong and thick material for supporting a rear wheel structure 27 best shown in FIGURES 1 and 2.

The rear wheel structure 27 comprises a pair of laterally and longitudinally extending spaced frame members 28 suitably connected by a rear brace 29 which also includes a bumper structure generally designated at 30. The forward ends of the frame members 28 are connected to a tubular cross member 31. An axle 32 is suitably supported on the frame members 28 and includes ground wheels 33. As best shown in FIGURES 1 and 2, the cradles 26 are shaped to conform to the outer peripheral surface of the cross member 31 and thus receive the cross member 31 in nesting relation. The cross member 31 is welded to the sides 21 and also, if desired, the upper rearmost edge of the sloping portion 23 may also be welded to the cross member 31 to provide a very strong and rigid construction. The welding operation may be performed in the field so that the wheel structure can be connected to the body as quickly as desired with a minimum effort. Likewise, if it is desired to remove the rear weld structure 27, it is a simple matter to remove the weld by a suitable cutting torch and thus the rear wheel structure 27 may be easily removed or replaced.

In effect, then, while the welding provides a rigid construction which could be considered permanent, the weld however is removable by conventional flame cutting means so that the structure in effect can easily and quickly be removed and thus a removable structure is in effect provided.

Referring now to FIGURES 4, 5, and 6, a tandem wheel structure is designated at 35 and comprises a frame 36. The frame 36 consists of laterally spaced frame members 37 having a rear cross member 38 and a front cross member 38'. A pair of upwardly extending draft plates 39 are suitably connected to the frame members 37, said draft plates 39 having welded thereto, as indicated at 40, a transversely extending tubular cross member 41 identical to the cross member 31 shown in FIGURES 1 and 2.

The tandem wheel structure 35 also includes a pair of longitudinally extending axle supports conventionally known as walking beams 42. Each walking beam 42 has connected thereto axles 43 which project outwardly laterally with respect to the frame 36. Each walking beam also has connected thereto an inwardly projecting shaft 44 which is suitably journaled on conventional bearing members 45 and 46 in turn supported within a tubular cross beam 47, the said beam being carried on and suitably connected to the frame members 37. The walking beam 42 on one side of the frame 36 thus is able to rock independently of the other walking beam 42 so as to adjust to the contour of the terrain to which the tandem structure is subjected.

A fifth wheel structure is generally designated at 48 and is particularly well shown in FIGURES 5, 7, 8, and 9. Ground wheels 49 are suitably connected to the axles 43 in conventional manner. The fifth wheel structure 48 includes a transversely extending beam 50 which is, as indicated in FIGURE 9, provided with inwardly projecting openings 51 which are engaged by pivot pins 52 suitably supported on the spaced frame members 36. The transverse beam 50 also includes longitudinally extending members 53 projecting outwardly on opposite sides of the transverse beam 50. The fifth wheel structure 48 is suitably made from a casting and thus the longitudinally extending and transverse beam may be integral. The longitudinal member 53 is also provided with inwardly extending openings 54 at opposite ends thereof. A yoke 55 supports opposed pivot members 56 which engage, as shown in FIGURES 7 and 8, the openings 54 so that the yoke 55 may pivot both about a longitudinally and a transversely extending axes. An upright spindle 57, as best shown in FIGURE 8, is integrally formed with the yoke 55, said spindle being in mating relation with respect to a housing 58 in turn suitably connected to the gooseneck 20 and specifically to gooseneck members 60.

Referring now to FIGURE 1, the wheel support 27 is in position for assembly with the body 18. It is a simple matter to place the transverse tubular member 31 in the cradles 26 and to weld the said tubular member 31 to the sides 21 and, if desired, to the upper end of the sloping bottom member 23. This can be accomplished in the field and it may then be desired to connect a series of bodies 18 in tandem or trainlike fashion as shown in FIGURE 4. Thus it is then necessary to remove the supporting wheel structure 27 from one of the bodies and this again can be done quickly in the field by merely utilizing a cutting torch and burning the weld from the cradles 26. Now it is a simple matter to weld the tubular cross member 41 of the tandem wheel structure 35 within the cradles by again applying the same type of weld to the tubular member 41 as was applied to the tubular member 31. The tandem wheel structure 35 is, of course, provided with the fifth wheel construction shown in FIGURES 7, 8, and 9, and thus the gooseneck 20 of thoe rear body 18 permits turning movement about a vertical axis and permits limited oscillation about a longitudinal and transverse axes so that the trailing body may be supported to follow the ground contour. The tandem wheel structure also is effected by means of the walking beam arrangement 42 so that the wheels naturally follow the contour of the ground. This is an important advantage in that the type of haulers utilized are off-the-highway type requiring them to traverse difficult ground contour.

The tractor 13 also has a similar fifth wheel construction as shown in FIGURES 7, 8, and 9 and since the details are identical, it is not believed necessary to show the fifth wheel structure 17 in detail. Thus the housing 58 may be interchangeably connected to the fifth wheel structure 17 or to the fifth wheel structure 48.

Thus it now can be seen that a simple and quickly changeable wheel supporting structure for an off-the-highway earth hauler has been provided and an improved tandem wheel supporting arrangement has also been disclosed. Both of these structures are quickly changeable for positive connection to the bodies of the haulers so that the haulers may be utilized as individual units or in train-type or tandem form as indicated. Thus the objects of the invention have been fully achieved, and it is believed that modifications may be made in the construction without departing from the spirit of the invention as disclosed or from the scope thereof as defined in the appended claims.

What is claimed is:

1. In an earthmoving vehicle comprising a four-wheel tractor having a tractor frame, a fifth wheel supported on said frame, a dump body, a gooseneck structure connected to a forward end of said dump body and to said fifth wheel of the tractor, said body including vertical sides, a bottom connected to said sides, said bottom having an upwardly sloping portion adjacent the rear ends of said sides, said sides having arcuate transversely aligned recesses at their rear ends adjacent the upper rear ends of said sides to provide supporting cradles; a rear wheel structure for supporting the rear of said body comprising a pair of laterally spaced frame members, an axle connected to said frame members, ground wheels supported on said axle, a transversely extending tubular member connected to said frame members, and means connecting said tubular member within said supporting cradles including securing means between said sides and said tubular member.

2. In an earthmoving vehicle comprising a four-wheel tractor having a tractor frame, a fifth wheel supported on said frame, a dump body, a gooseneck structure connected to a forward end of said dump body and to said fifth wheel of the tractor, said body including vertical sides, a bottom connected to said sides, said sides having transversely aligned recesses at their ends adjacent the upper rear ends of said sides to provide supporting cradles; a rear wheel structure for supporting the rear of said body comprising a pair of laterally spaced frame members, an axle connected to said frame members, ground wheels supported on said axle, a transversely extending tubular member connected to said frame members, and means connecting said tubular member within said supporting cradles including securing means between said sides and said tubular member.

3. In an earthmoving vehicle comprising a four-wheel tractor having a tractor frame, a fifth wheel supported on said frame, a dump body, a gooseneck structure connected to a forward end of said dump body and to said fifth wheel of the tractor, said body including vertical sides, a bottom connected to said sides, said bottom having an upwardly sloping portion adjacent the rear ends of said sides, said sides having arcuate transversely aligned recesses at their rear ends adjacent the upper rear ends of said sides to provide supporting cradles; a rear wheel structure for supporting the rear of said body comprising a frame, an axle connected to said frame, ground wheels supported on said axle, a transversely extending tubular member connected to said frame, and means connecting said tubular member within said supporting cradles including securing means between said sides and said tubular member.

4. In an earthmoving vehicle comprising a four-wheel tractor having a tractor frame, a fifth wheel supported on said frame, a dump body, a gooseneck structure connected to a forward end of said dump body and to said fifth wheel of the tractor, said body including vertical sides, a bottom connected to said sides, said sides having transversely aligned recesses at their rear ends to provide supporting cradles; a rear wheel structure for supporting the rear of said body comprising an axle connected to said frame, ground wheels supported on said axle, a transversely extending frame member connected to said frame, and means connecting said frame member within said supporting cradles including securing means between said sides and said frame member.

5. In an earthmoving vehicle comprising a wheel tractor having a tractor frame, a first fifth wheel structure supported on said tractor frame, a first dump body, a first gooseneck connected to said body and said first fifth wheel structure on said tractor, a second dump body positioned in tandem relation with respect said first body, both bodies including upright sides and a bottom, said sides having rearwardly positioned recesses to provide cradles, said second body including a rear wheel supporting structure, comprising a wheeled frame having a transversely extending first tubular member supported within said cradles of said second body; a tandem wheel structure connecting said bodies in tandem relation comprising a pair of laterally spaced frame members, an axle support including longitudinally extending members disposed outwardly on opposite sides of said frame members, a transversely extending shaft means connected to said longitudinally extending members substantially centrally thereof, means pivotally supporting said shaft means on said frame members for pivotal movement about a transverse axis, axles on said longitudinal members, laterally spaced front and rear wheels rotatably positioned on said axles, whereby said axle support may rock on said frame members, a transversely extending second tubular member connected to said frame members, means supporting said second tubular member in said cradles of said first dump body, a second fifth wheel mounted on the frame members, a second gooseneck structure on said second body, said second fifth wheel structure comprising a spindle, means on said spindle and frame members supporting said spindle for pivotal movement about longitudinal and transverse axes, and a housing on said second gooseneck structure pivotally connected to said spindle for pivotal movement about a vertical axis.

6. In an earthmoving vehicle comprising a wheel tractor having a tractor frame, a first fifth wheel structure supported on said tractor frame, a first dump body, a first gooseneck connected to said body and said first fifth wheel structure on said tractor, a second dump body positioned in tandem relation with respect said first body, both bodies including upright sides and a bottom, said sides having rearwardly positioned recesses to provide cradles, said second body including a rear wheel supporting structure, comprising a wheeled frame having a transversely extending first tubular member supported within said cradles of said second body; a tandem wheel structure connecting said bodies in tandem relation comprising a frame, an axle support including longitudinally extending members having central portions thereof connected to said frame whereby said axle support may be rocked about a transverse axis, axles on said longitudinal members, laterally spaced front and rear wheels rotatably positioned on said axles, a transversely extending second tubular member connected to said frame, means supporting said second tubular member in said cradles, a second fifth wheel mounted on the frame, a second gooseneck structure on said second body, said second fifth wheel structure comprising a spindle, means on said spindle and frame supporting said spindle for pivotal movement about longitudinal and transverse axes, and a housing on said second gooseneck structure pivotally connected to said spindle for pivotal movement about a vertical axis.

7. In an earthmoving vehicle comprising a wheel tractor having a tractor frame, a first fifth wheel structure supported on said tractor frame, a first dump body, side walls on said first body, said body including rearwardly disposed cradles, a first gooseneck connected to said body and said first fifth wheel structure on said tractor, a second dump body positioned in tandem relation with respect said first body, said second body having a rear wheel supporting structure; a tandem wheel structure connecting said bodies in tandem relation comprising a frame, an axle support including longitudinally extending members having central portions thereof connected to said frame whereby said axle support may be rocked about a transverse axis, a transversely extending frame member connected to said frame, means supporting said frame member in said cradles, a second fifth wheel mounted on the frame, a second gooseneck structure on said second body, said second fifth wheel structure comprising a spindle, and a housing on said second gooseneck structure pivotally connected to said spindle for pivotal movement about a vertical axis.

8. In an earthmoving vehicle comprising a wheel tractor having a tractor frame, a first fifth wheel structure supported on said tractor frame, a first dump body, side walls on said first body, said body including rearwardly disposed cradles, a first gooseneck connected to said body and said first fifth wheel structure on said tractor, a second dump body positioned in tandem relation with respect said first body, said second body having a rear wheel supporting structure; a tandem wheel structure connecting said bodies in tandem relation comprising a frame, an axle support including longitudinally extending members having central portions thereof connected to said frame whereby said axle support may be rocked about a transverse axis, a transversely extending frame member connected to said frame, means supporting said frame member in said cradles, a second fifth wheel mounted on the frame, a second gooseneck structure on said second body, said second fifth wheel structure comprising a spindle, means on said spindle and frame supporting said spindle for pivotal movement about longitudinal and transverse axes, and a housing on said second gooseneck structure pivotally connected to said spindle for pivotal movement about a vertical axis.

References Cited in the file of this patent

UNITED STATES PATENTS

| | | |
|---|---|---|
| 2,233,193 | Armington et al. | Feb. 25, 1941 |
| 2,377,315 | Beitzel | June 5, 1945 |
| 2,479,800 | Williams | Aug. 23, 1949 |
| 2,486,072 | Smith | Oct. 25, 1949 |
| 2,587,208 | Peterson | Feb. 26, 1952 |
| 2,901,844 | Rockwell | Sept. 1, 1959 |